United States Patent [19]

Pfeffer et al.

[11] Patent Number: 5,364,605
[45] Date of Patent: Nov. 15, 1994

[54] RECOVERY OF CYANIDE FROM PRECIOUS METAL TAILINGS

[75] Inventors: Henry A. Pfeffer, Mercerville; Gary E. Wolfe, Trenton, both of N.J.

[73] Assignee: FMC Corporation, Philadelphia, Pa.

[21] Appl. No.: 710,479

[22] Filed: Jun. 5, 1991

[51] Int. Cl.⁵ .............................................. C01C 3/00
[52] U.S. Cl. ..................................... 423/236; 423/29; 423/372; 423/379; 423/658.5; 210/904
[58] Field of Search .............. 423/29, 372, 379, 658.5, 423/236; 210/904

[56] References Cited

U.S. PATENT DOCUMENTS

| | | | |
|---|---|---|---|
| 2,590,146 | 3/1952 | Barsky | 23/151 |
| 3,101,320 | 8/1963 | Lancy | 210/62 |
| 3,275,547 | 9/1966 | Bucksteeg et al. | 210/5 |
| 3,510,424 | 5/1970 | Zumbrunn | 210/63 |
| 3,592,586 | 7/1971 | Scott | 423/379 |
| 3,617,567 | 11/1971 | Mathre | 210/50 |
| 3,935,188 | 1/1976 | Karwat | 423/236 |
| 4,176,060 | 11/1979 | Sury et al. | 210/62 |
| 4,189,307 | 2/1980 | Marion | 48/197 R |
| 4,321,145 | 3/1982 | Carlson | 210/678 |
| 4,417,987 | 11/1983 | Harrison | 210/759 |
| 4,478,802 | 10/1984 | Honkaneimi et al. | 423/236 |
| 4,732,609 | 3/1988 | Frey et al. | 75/117 |
| 4,752,400 | 6/1988 | Pearson | 210/718 |
| 4,847,062 | 7/1989 | Rogers et al. | 423/379 |
| 4,994,243 | 2/1991 | Goldstone et al. | 423/29 |
| 5,236,557 | 8/1993 | Müller | 203/10 |

FOREIGN PATENT DOCUMENTS 8884408 11/1988 WIPO ................. 423/372

OTHER PUBLICATIONS

Michael J. Kitney-Cyanide Regeneration from Gold Tailings-Perth Gold Conference, pp. 88–93, 1988.

Primary Examiner—Gary P. Straub
Assistant Examiner—Timothy C. Vanoy
Attorney, Agent, or Firm—Frank Ianno; Robert L. Andersen

[57] ABSTRACT

Process for recovering cyanide values from a mill tailings stream remaining after gold and silver have been leached from an ore, by treating the tailings stream containing both ore insolubles and remaining cyanide leachant, without a preliminary filtration, to acidification with an acid to a pH of at least 4, stripping the cyanide values therefrom with a stripping gas in a stripping column such as a baffle plate column wherein the average residence time of the column is sufficiently low that the pH of the stream does not rise above about 4 and the ore insolubles do not plug the column, introducing the stripping gas and stripped cyanide values into an absorbing column containing an alkaline liquor to absorb the cyanide values, recovering the absorbed cyanide values, and removing a stripped tailings stream reduced in cyanide values.

15 Claims, 2 Drawing Sheets

RECOVERY OF CYANIDE FROM PRECIOUS METAL TAILINGS

FIELD OF THE INVENTION

This invention relates to recovery of cyanide values used in leaching gold and silver from ores and particularly to recovery of the cyanide values from the metal tailings remaining after the gold and silver have been leached from such ores.

DESCRIPTION OF THE PRIOR ART

In the process of leaching gold and silver from precious metal ores, a cyanide leachant, usually an aqueous sodium cyanide solution, is employed to leach the gold and silver from the remaining constituents of the ore in a mill circuit. The ore must first be finely ground, such as by ball milling the ore to $-100$ microns, in order to assure good contact of the cyanide leachant with all of the gold contained in the ore. After this finely ground ore has been slurried with leachant in several stages and its precious metals separated and recovered, the remaining slurry of insolubles which is called a mill tailings stream is placed in a tailings pond to settle out the leached solids. The tailings stream, which is made up of about 50 to 70 weight percent ore solids in a slurry of residual leaching solution, contains from about 200 to 1100 ppm of cyanide values ("cyanide values" means the cyanide anion remaining in solution). Environmental regulations restrict the concentrations of cyanide both in the tailings pond and in any streams emanating from it. It is possible to chemically oxidize the cyanide to permitted levels, but the cost of the oxidant and the loss in value of the cyanide is very high.

Recovery of cyanide values is possible by simple acidification of the tailings stream and stripping of evolved HCN in a series of countercurrent high efficiency packed or bubble-cap columns. However, this can be carried out only after the solids have been filtered from the leachant to provide a solids-free leachant solution for such treatment. This filtration is costly and difficult because of the extremely fine size of the tailing solids. Such filtration is normally required for the following reasons.

Initially, countercurrent contact of the acidified tailings stream with the stripping gas is the contact method of choice because it is most efficient, reduces the stripping gas (air) flow requirements to a minimum and keeps equipment sizes and blower requirements down.

Such countercurrent contact would be carried out in conventional high efficiency columns, such as packed or tray columns, in order to reduce the cyanide values in the leachant down to acceptable environmental levels. However, such conventional countercurrent columns cannot tolerate the high solids content of the tailings stream without plugging.

It is possible to attempt to carry out effective stripping of the unfiltered, acidified tailings stream in a series of mixing vessels, each representing a stripping stage, but many stages would be required and the cost of such equipment would be high. Further, the long residence time required by such a series of stages would permit the pH of the leachant to rise above about 4, which would bind the cyanide values in solution. The tailings solids contain alkaline metals such as calcium, magnesium, etc. which react with and consume the added acid and raise the pH of the leachant. At a pH of above about 4, the cyanide values form stable metal cyanide complexes with zinc, copper, mercury, etc. that remain in solution and cannot be volatilized and recovered. These complexed cyanide values cannot be stripped from the leachant unless these cyanide complexes are broken and hydrogen cyanide reformed.

For the above reasons, solids removal from the tailings stream followed by air stripping of the leachant solution in countercurrent, high efficiency columns would be the normal process of choice. The absence of solids permits such columns to function without plugging and avoids increases in pH of the leachant, even if its residence time in the columns is long, because of the absence of the alkaline metals containing solids.

SUMMARY OF THE INVENTION

It has now been found that cyanide values can be recovered from a mill tailings stream containing both ore insolubles and a leachant having cyanide values, without the need to filter the solids from the leachant, by acidifying said stream to a pH of about 4 and below, introducing the acidified stream into a stripping column, preferably a baffle plate column, in which the average residence time of the acidified stream in the stripping column is sufficiently low that the pH of the acidified stream in the stripping column does not rise above about 4, introducing a stripping gas into the stripping column in contact with the acidified stream to strip volatile cyanide values evolved from the acidified stream, introducing the stripping gas and stripped volatile cyanide values into an absorbing column, absorbing the cyanide values in an alkaline liquor, preferably an aqueous solution of either sodium hydroxide or calcium hydroxide, which is in contact with the cyanide values in the absorbing column and recovering the absorbed cyanide values.

BRIEF DESCRIPTION OF THE DRAWINGS

The invention will be further understood by reference to the accompanying drawings.

DESCRIPTION OF THE INVENTION

Figure 1:
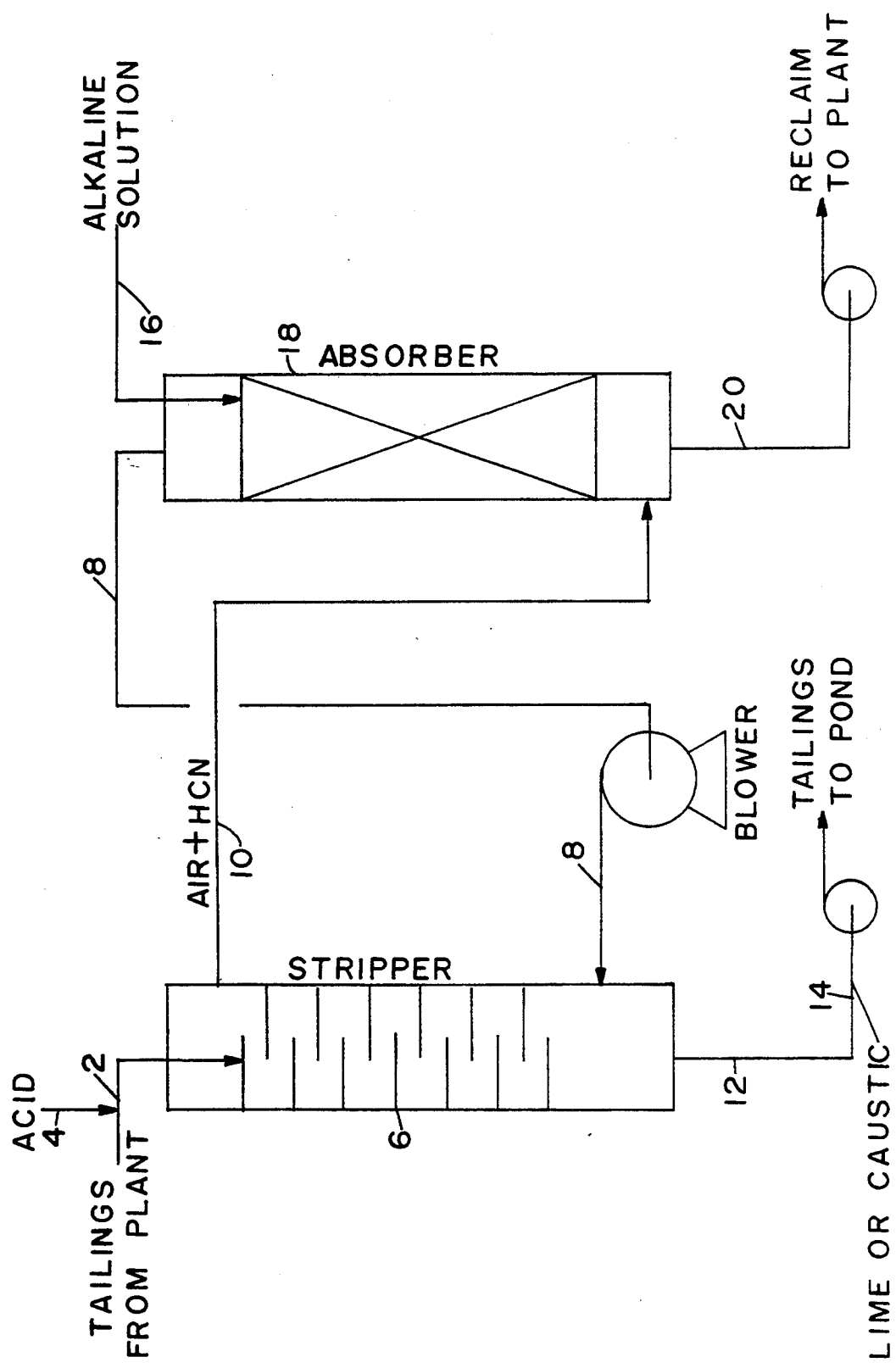
FIG. 1 is a diagrammatic flow plan of the process wherein a stripping stage and an absorbing stage are illustrated along with accompanying flow streams to and from each of these stages.

In carrying out the present invention, the tailings stream from the mill circuit, containing both solids and leachant, is first treated with an acid to bring its pH to about 4 and below. In the preferred mode, the acid is introduced into the tailings stream and uniformly mixed with the stream, such as by in-line mixing, before it is introduced into the stripping column. While it is also possible to introduce acid and the tailings stream separately into the stripping column, it is preferred to add the acid directly to the tailings stream before it enters the stripping column to assure that the stream has been uniformly acidified before stripping of the stream takes place.

The acid employed may be any acid which will lower the pH of the tailings stream and which does not chemically react or is volatilized with the hydrogen cyanide evolved from the tailings stream when it is acidified. The acids that may be employed include any non-volatile mineral or organic acid, that does not chemically react with hydrogen cyanide and which has enough acidity to reduce the pH of the tailings stream to about 4 and below. The mineral acids, such as sulfuric acid and phosphoric acid are preferred, with sulfuric acid being most preferred because it is the least expensive, readily available and most effective for this application.

The tailings stream is acidified by the acid to a point where the cyanide values will be converted to hydrogen cyanide and be evolved as gaseous HCN from the tailings stream. At a pH of about 4 and below, this can readily be carried out and assures that all HCN can be liberated. The intent here is to break any metal complexes of cyanide formed by the metals in the tailings stream. Different metals complex with or fix cyanide at different pH values. It is possible that higher pH's than 4 can be employed, depending on the specific metals which may be present in the ore residues of the tailings stream. However, to be absolutely sure that cyanide values will be liberated, a pH of about 4 or below is recommended.

The tailings stream that comes from the mill circuit typically has from about 50 to 70 weight percent of insolubles in the slurry, the remainder being the aqueous cyanide leachant. Normally, the leachant is an aqueous solution of sodium cyanide. Enough acid, preferably sulfuric acid, is added to this tailings stream to lower its pH to about 4 and below, to assure maximum evolution and recovery of cyanide values. Upon acidification, the cyanide values are converted to hydrogen cyanide gas and are evolved from the tailings stream. For this reason, the acidification of the tailings stream is carried out just prior to or contemporaneous with its introduction into the stripping column. Typically, the acidified tailings stream is introduced into the top of the stripping column and any stripping gas is introduced into the bottom of the column.

The stripping column must meet two criteria. First, it must be able to handle both liquid and solids so that the solids portion of the tailings stream does not get stuck on any of the interior separatory means of the column. Secondly, the acidified tailings stream must be treated in the stripping column before its pH has risen above about 4. This necessitates using a stripping column that has a sufficiently low average residence time which permits the acidified tailings stream to be treated completely before its pH has risen above about 4. The pH of the tailings stream rises because the metal impurities in the insoluble fraction of the tailings stream react with the acid and cause the pH to rise at a fairly rapid rate. Once the pH has risen to some value above about 4, depending on the specific metal impurity involved, the metals form cyanide complexes with the cyanide values which are extremely stable and prevent evolution of the hydrogen cyanide and recovery of the cyanide values from the tailings stream. In general, the average residence time should not be over about 20 minutes and can be about one minute or less. The stripping column which most readily meets these requirements is the so-called baffle plate column which has internal baffles allowing the tailings stream to be broken up into a plurality of thin sheets of liquid and solids that cascade by gravity from baffle to baffle down the column.

As the multiple streams of slurry cascade from baffle to baffle down the column, a stripping gas is introduced into the base of the stripping column and flows countercurrently upward and through the downward flowing streams of slurry. The baffles within the stripping column may be of any number of known designs. These include baffle plates which extend from opposite sides of the column and overlap one another in the center of the column so that the down-coming stream must flow to alternate sides of the column as it cascades from plate to plate. Another design (disk and doughnut) has central holes in the plates while alternating plates have peripheral openings around the edge of the plates so that the liquid cascades from the center of one plate down to the edge of the next plate back to the center of the next lower plate and so on. Either of these designs can handle both liquids and solids and have average residence times as low as one minute.

The acidified tailings stream is treated in the stripper column for average residence times ranging from about one minute to about 20 minutes. In all cases, the stripping must be achieved before it reaches a pH above about 4. The exact amount of time required for the acidified tailings stream to reach such pH will depend in part upon the amount and types of metals which are in the insoluble fraction of the ore in the tailings stream. The greater the concentration of these metal ores in the insoluble portions of the tailings stream the faster the pH of the tailings stream will rise above pH 4. It is desirable to reduce the average residence time of the acidified tailings streams in the stripping column as much as possible with periods of one to five minutes being preferred.

A stripping gas is introduced into the base of the stripper column to strip the liberated hydrogen cyanide from the acidified tailings stream. The stripping gas flows upwardly through the column countercurrent to the downwardly flowing streams of tailings liquid and strips the liberated hydrogen cyanide from the tailings stream as it cascades downwardly through the stripper column. The stripper gas can be air or any gas that does not chemically react with the hydrogen cyanide or anything or in the milled tailings stream. Air is preferred since it is effective, readily available and does not react with the hydrogen cyanide.

A mixture of the stripping gas and stripped hydrogen cyanide is removed from the upper portions of the stripper column and is introduced into the base of an absorber column. The absorber column can be a packed or bubble-cap column of conventional design or a baffle plate column like the stripper. Into the top of the absorber column an absorbing liquor is introduced which flows downwardly countercurrent to the stripping gas and hydrogen cyanide which flows upwardly through the absorber column. The absorber liquor absorbs the hydrogen cyanide from the stripping gas and is removed from the base of the absorber as an alkaline cyanide stream. The absorber liquor normally employed is a dilute solution of an alkaline salt or an alkaline metal hydroxide such as sodium hydroxide or calcium hydroxide. If the absorber liquor is a solution of sodium hydroxide, the product recovered from the absorber is an aqueous solution of sodium cyanide. This is then recycled back to the mill circuit for reuse of the cyanide values. The use of a aqueous sodium hydroxide absorber liquor is preferred because the resulting sodium cyanide solution which is recovered is totally compatible in the mill circuit with conventional sodium cyanide employed in the process.

In the above process, the residue from the stripping column is an acidified tailings stream whose cyanide values have been reduced by being stripped from the stream. If this residue stream contains cyanide values which are not environmentally objectionable, for example, no higher than 25 ppm, it is usually treated by adding lime or caustic soda to it to raise its pH above 10 and then placed in a tailings pond. A pH of at least 10 is necessary to assure that no cyanide values are released as HCN. Values of HCN which do not exceed 25 ppm have been generally accepted as being safe for environmental purposes, including bird life and the like. If the residual cyanide value of the residue stream is above that considered environmentally objectionable, for example, 100 ppm, it too is treated with lime or sodium hydroxide to raise its pH to above about 10 in the same way as previously described. However, this stream also must be treated with an oxidizing material such as hydrogen peroxide or other active oxygen compounds such as sodium hypochlorite, ozone or chlorine to reduce its cyanide content to acceptable levels. Since the amount of cyanide that must be chemically oxidized is quite small the cost of doing this is very low because of the small amount of oxidizing material that must be employed. The precise amount of cyanide values in the residue stream will, of course, depend upon a number of factors including the cyanide values of the incoming tailings stream, the number of plates in the stripper column, and the residence time of the tailings stream in the stripper column and the air to tailings flow ratio. Further, of course, the efficiency of the stripping operation, in terms of equivalent theoretical plates employed in the stripper column will also be a factor in the amount of residual cyanide values found in the residue stream.

In the above described operation of the stripper column, the preferred gas introduced into the stripper column has been identified as air. Further, in the preferred mode of operation, the stripper gas that is introduced into the stripper column is the gas stream that is obtained overhead from the absorber column. This gas stream, which has been through the absorber column, may nevertheless contain minute amounts of unabsorbed hydrogen cyanide. Thus, it is preferred to use this as the source of stripping gas in the stripper column, supplemented by as much air as required, to carry out the stripping operation. This closes the loop in the streams linking the absorber column and the stripper column and eliminates the need to pass any overhead gas stream from the absorber column through a further filter or other absorbing unit to eliminate any residual HCN from being discharged into the air.

The invention will now be described with reference to the drawings.

In FIG. 1 of the drawings, a tailings stream from the plant 2 is treated with sufficient acid 4 to reduce its pH to no higher than about 4. The preferred acid is an inorganic acid, especially sulfuric acid, and it is introduced into the tailings stream 2 by means of an in-line mixing T, not shown. The acidified tailings stream 2 is then introduced into the top of stripping column 6. The stripping column 6 preferably is a baffle-typed that permits the tailings stream to cascade down the baffles to the base of the stripping column 6 without any solids sticking to the plates. The average residence time of the stripper column 6 must be sufficiently low that the tailings stream has been fully treated in stripping column 6 before its pH has risen above about 4. The average residence time employed is from about one to about 20 minutes and preferably from about one to five minutes.

A stripping gas 8 is introduced into the base of the stripping column 6 to strip the acidified tailings stream 2 of any liberated hydrogen cyanide. The stripping gas is preferably air, although any gas that is inert to hydrogen cyanide and the tailings may be employed. After stripping has been completed, the stripping gas, preferably air and stripped hydrogen cyanide 10 is passed into the base of an absorber column 18. The stripped tailings are removed from stripper column 6 as stream 12 and are treated with an alkaline solution, preferably sodium hydroxide or calcium hydroxide to increase the pH of the stream 12 to above about 10. The thus-treated stream 12 is then passed into a tailings pond.

In absorber 18, the gas stream 10 coming overhead from stripper 6 is treated with an alkaline solution, preferably sodium hydroxide 16 which is passed into the top of the absorber column 18 to absorb all cyanide values in stream 10 which is fed into the base of absorber column 18. Absorber column 18 does not handle any solids and therefore it may be a conventional bubble-cap or packed column design to perform its absorbing function. Stream 20 is removed from the base of absorber column 18 and contains the cyanide values which have been absorbed in alkaline solution 16.

If the alkaline solution used to absorb the cyanide values is a sodium hydroxide containing solution then the resulting sodium cyanide values in stream 20 can be sent directly to the plant where the sodium cyanide values can be recirculated to the mill circuit. If desired, the alkaline solution stream 16 can be obtained from the tailings pond since the liquid from this pond is alkaline. If desired, additional sodium hydroxide or other alkaline additives can be used to assure sufficient alkaline values to absorb the HCN values from stream 10.

The gas stream 8 that is obtained from the top of absorber column 18, and which contains the stripping gas and any residual unabsorbed-cyanide, is employed to supply the stripping gas 8 to stripper column 6. In that way, any unabsorbed hydrogen cyanide gas is recirculated back to the stripping column 6, closing the loop between the stripper column 6 and absorber column 18. If the overhead gas stream from absorber column 18 is not used to supply the gas stream to stripping column 6, it must be passed through an additional scrubber to assure that any residual hydrogen cyanide values are not discharged into the air.

The following examples illustrate the present invention.

EXAMPLE 1

Figure 2:
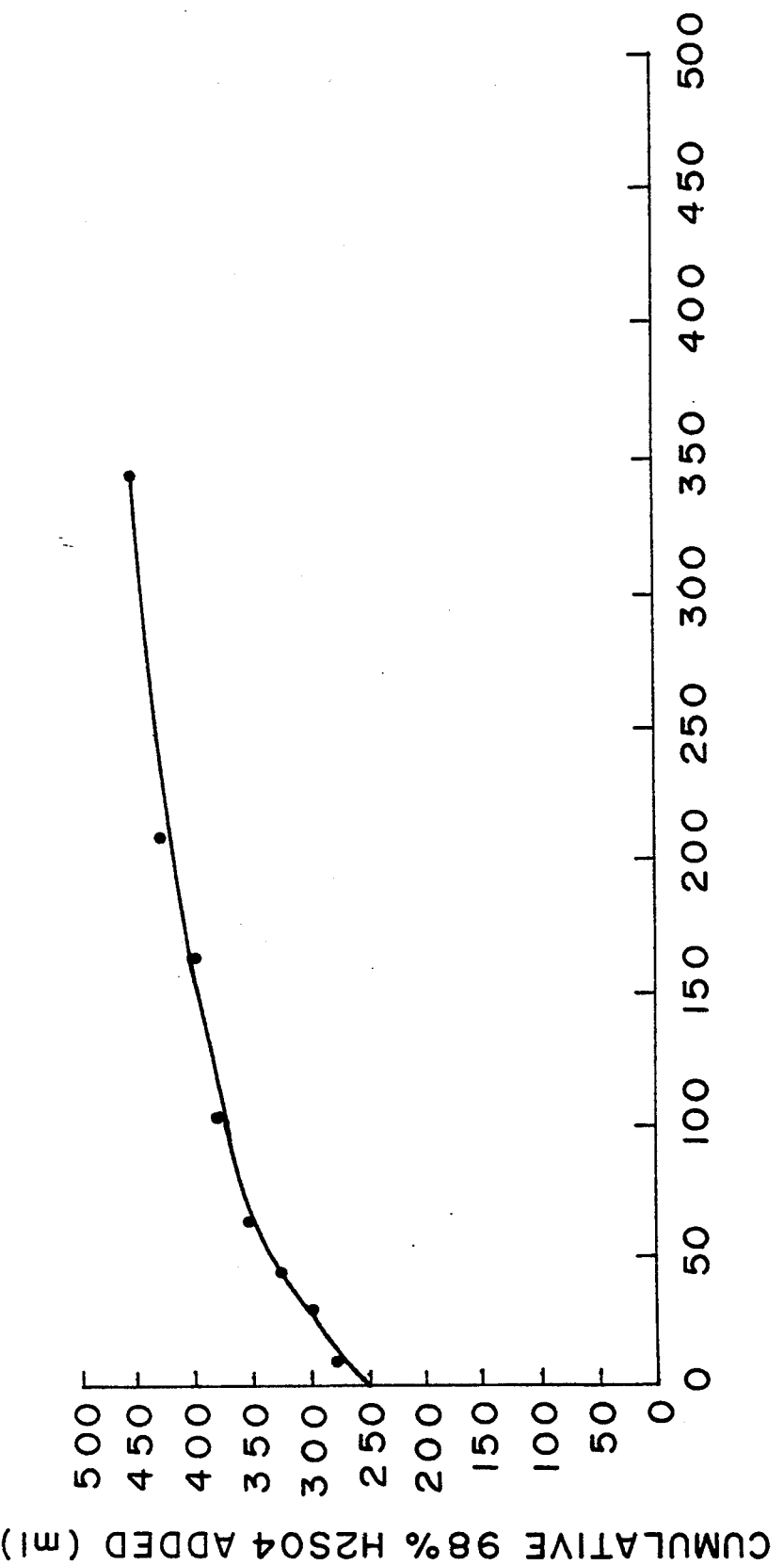
FIG. 2 is a graph of the amount of acid consumed by the solids in the tailings stream to maintain the stream at pH 4.

In order to demonstrate the acid consuming properties of solid ore residues when present in a tailings stream, the following test was performed. A 40 gallon batch of tailings stream from a mill circuit, containing both solids and cyanide leachant, was acidified with sulfuric acid to pH 4. The pH was then monitored and additional sulfuric acid was added to maintain the pH at 4. The cumulative amounts of acid (in milliliters of 98% $H_2SO_4$) was recorded against time. A plot of the results is given in FIG. 2. As will be observed from FIG. 2, substantial added acid was necessary, particularly in the first hour to keep the pH at 4. If the acid were not added, the pH of the tailings streams would progressively climb from 4 to increasingly higher values with time.

EXAMPLE 2

In order to demonstrate the feasibility of treating a tailings stream containing both solids and liquids in a stripping column, the following test was carried out using a laboratory stripping column of baffle plate design having two theoretical plates. The column was constructed of an 8 inch diameter polyvinyl chloride pipe having a total height of 76 inches, with a height of 43 inches from the upper liquid inlet to the lower gas inlet. It contained 10 baffle plates at three inch intervals placed on alternate sides of the column, each plate occupying about 50% of the internal column area and each plate inclined downwardly at a 14° slope from horizontal. Each plate extended beyond the midline of the column so that feed was required to flow down the column by cascading from plate to plate. It had the general configuration shown in FIG. 1.

A treated, tailings stream, containing both solid ore residues and liquid leachant residue, whose pH was lowered to 4 by sulfuric acid addition, was introduced into the top of the above laboratory stripping column at an initial rate of 4.3 gallons/minute. The feed rate varied from 4.3 to 5.5 gpm during the course of the test and the tailings stream had a solids content ranging from 40 to 65% by weight. Simultaneously, air which was used as the stripping gas was passed into the gas inlet at the base of the column at an initial rate of 98 SCFM, and this rate varied from 40 to 125 SCFM during the test. The stripping gas was removed from the top of the column and passed into an absorbing zone containing sodium hydroxide solution, to absorb all hydrogen cyanide stripped from the tailings stream. A bottom stream of stripped tailings from the column was recovered that had a pH of 4 and contained less than 170 ppm of cyanide values. This stream requires treatment with hydrogen peroxide as well as being treated with lime to pH 10, before being passed into a tailings pond. The average residence time of the feed in the column was just less than one minute.

In the above test, the laboratory stripping column handled the solids and liquid feed stream without any material amount of feed sticking to the baffle plates. The bottom stream contained a higher amount of cyanide values than would be desired in a commercial unit, because of the small number of theoretical plates the laboratory column contained. However, this laboratory information was sufficient to determine the feasibility of the process and also to calculate the number of theoretical plates necessary to reduce the cyanide values in the bottom stream to desired limits.

We claim:

1. Process of recovering cyanide values from a mill tailings stream comprising both ore insolubles and a leachant containing cyanide values, by acidifying said stream to a pH of about 4 and below, introducing the acidified stream into a stripping column in which the average residence time of the acidified stream in the stripping column is sufficiently low that the pH of the acidified stream in the stripping column does not rise above about 4, passing a stripping gas into the stripping column in contact with the acidified stream to strip volatile cyanide values evolved from the acidified stream, removing a tailing stream from the stripping column reduced in cyanide values, removing the stripping gas and stripped volatiles cyanide values from the stripping column and introducing them into an absorbing column, absorbing the cyanide values in an alkaline liquor that contacts the cyanide values in the absorbing column and recovering the absorbed cyanide values.

2. Process of claim 1 in which the stripping column is a column, containing baffle-plate means permitting both solids and liquids in the tailings stream to flow readily through the column.

3. Process of claim 1 in which the average residence of the tailing stream in the stripped column is from about one to about 20 minutes.

4. Process of claim 1 in which the alkaline liquor in said absorbing column is an aqueous solution of an alkaline material selected from the group consisting of sodium hydroxide, potassium hydroxide and calcium hydroxide.

5. Process of claim 1 wherein the stripped tailings stream from said stripper is treated with an alkaline material to increase its pH to about 10 or above before being sent to a tailings pond.

6. Process of claim 1 wherein the stripped tailings stream from said stripper, reduced in cyanide values, is treated with an oxidizing agent to further reduce its cyanide values to environmentally acceptable levels.

7. Process of claim 6 wherein the oxidizing agent employed is hydrogen peroxide.

8. Process of claim 1 wherein the stripping gas is air.

9. Process of claim 1 wherein any stripping gas and unabsorbed cyanide values exiting from the absorbing column are recycled into the stripping column to supply the stripping gas.

10. Process of claim 1 wherein said acidified stream is stripped of said cyanide values in said stripping column before said stream reaches a pH above about 4.

11. Process of recovering cyanide values from a mill tailings stream comprising both ore insolubles and a leachant containing cyanide values by acidifying said stream with a member selected from the group consisting of sulfuric acid and phosphoric acid to a pH of about 4 and below, introducing the acidified stream into a stripping column containing baffle-plate means in which the average residence time of the acidified stream in the stripping column is sufficiently low that the pH of the acidified stream in the stripping column does not rise above about 4, passing an air stream into the stripping column in contact with the acidified stream to strip volatile cyanide values evolved from the acidified stream, removing air and stripped volatile cyanide values from the stripping column and introducing them into an absorbing column, absorbing the cyanide values in an aqueous solution of a member selected from the group consisting of sodium hydroxide and calcium hydroxide in the absorbing column, removing a gas stream from the absorbing column containing air and any unabsorbed volatile cyanide values and recycling this gas stream to the stripping column for use as said air stream, recovering a stream containing the absorbed cyanide values from said absorbing column, and recovering a stripped tailings slurry stream having a reduced cyanide value content.

12. Process of claim 11 wherein the average residence time of the stripping column is from about one to about 20 minutes.

13. Process of claim 11 wherein the stripped tailings stream from said stripper, reduced in cyanide values, is treated with an oxidizing agent to further reduce its cyanide values to environmentally acceptable levels.

14. Process of claim 13 wherein the oxidizing agent employed is hydrogen peroxide.

15. Process of claim 12 wherein the average residence time of the stripping column is from about one to about five minutes.

* * * * *